March 10, 1936.   F. M. DAVIS   2,033,686
MULTIPLE OPERATION MACHINE
Filed June 10, 1933   3 Sheets—Sheet 1
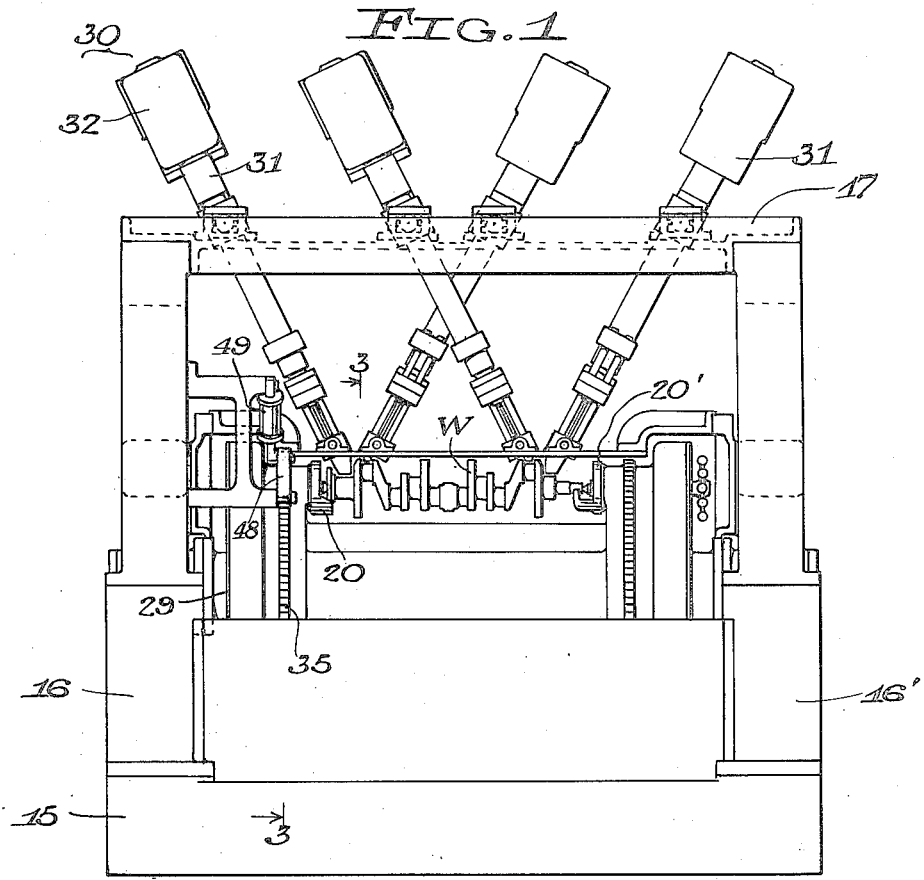
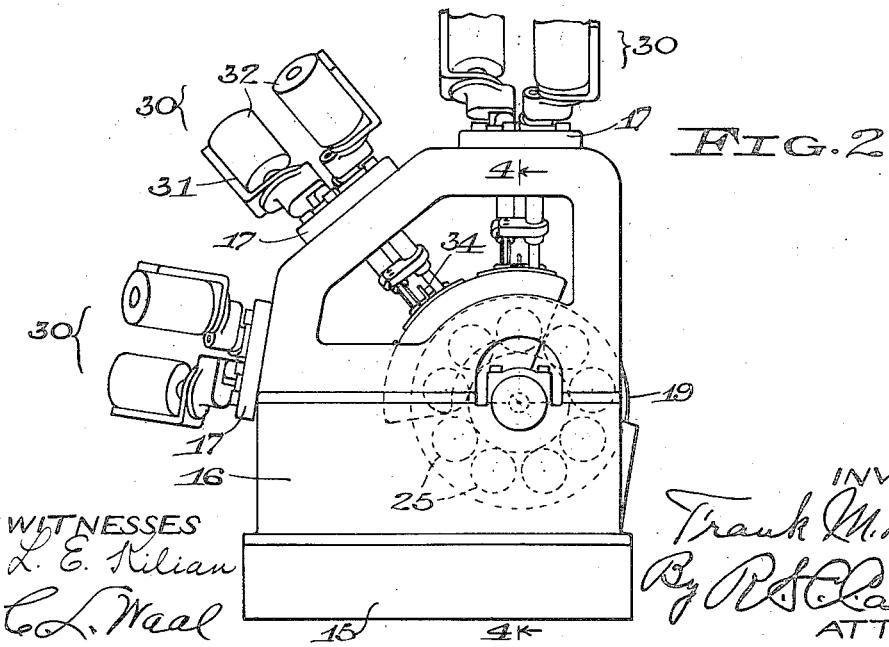

March 10, 1936.    F. M. DAVIS    2,033,686
MULTIPLE OPERATION MACHINE
Filed June 10, 1933    3 Sheets-Sheet 2

WITNESSES
L. E. Kilian
C. L. Wade

INVENTOR
Frank M. Davis
By R. S. Caldwell
ATTORNEY

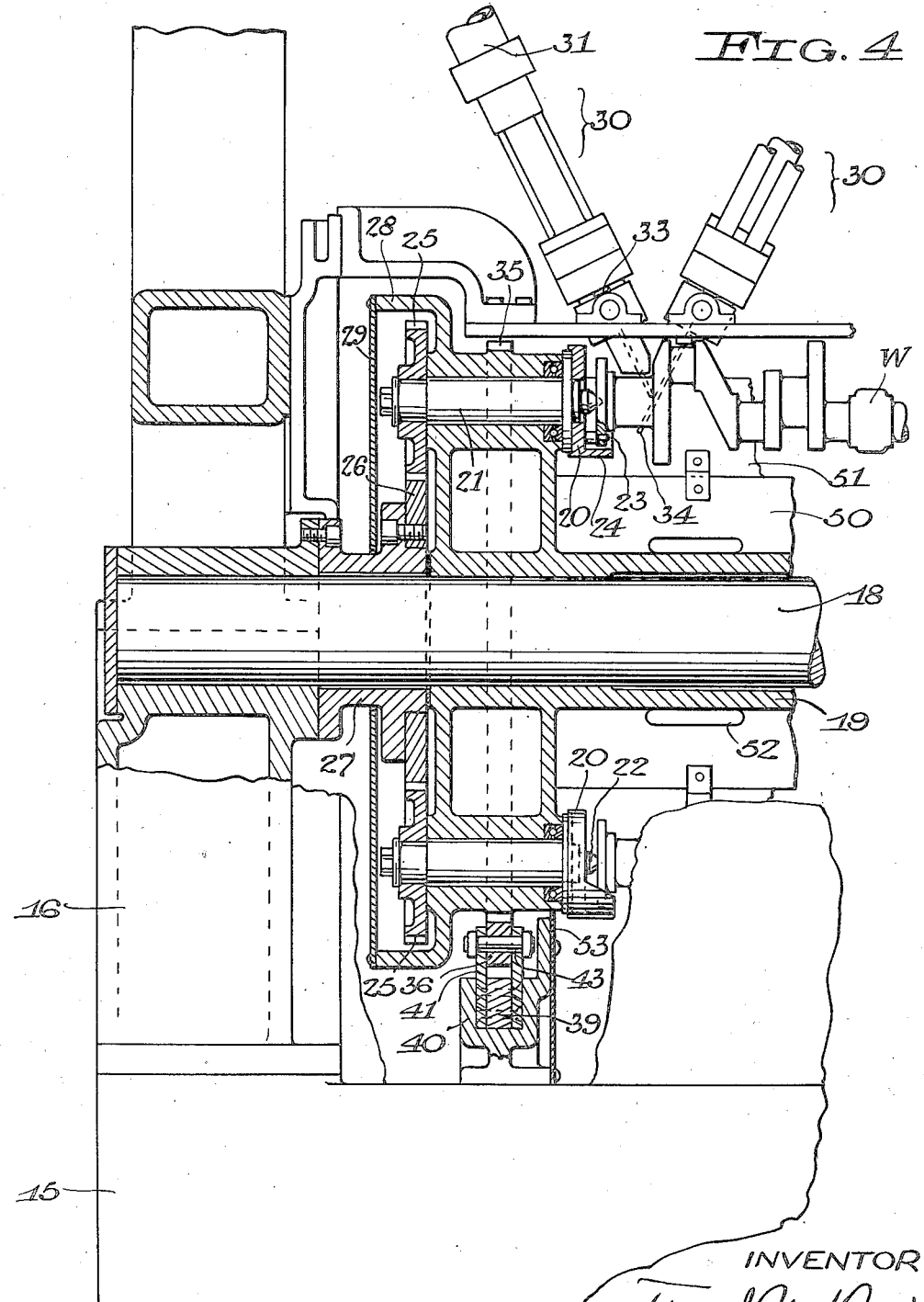

Patented Mar. 10, 1936

2,033,686

UNITED STATES PATENT OFFICE 2,033,686

MULTIPLE OPERATION MACHINE

Frank M. Davis, Milwaukee, Wis., assignor to Davis and Thompson Company, West Allis, Wis., a corporation of Wisconsin Application June 10, 1933, Serial No. 675,275

2 Claims. (Cl. 77—64)

The invention relates to machine tools and more particularly to those of the multiple station type.

An object of the invention is to provide a machine tool having a rotatable work carrier on which a plurality of work holders are rotatably mounted for angular movement to different tooling positions, there being simple but effective indexing means for moving the work carrier step-by-step and for accurately locating the work holders in their tooling positions, and the machine tool being of compact construction to conserve floor space.

The invention further consists in the several features hereinafter described and claimed.

In the accompanying drawings,

Fig. 1 is a side elevation of a drilling machine embodying the invention;

Fig. 2 is an end view of the machine;

Fig. 4 is a sectional elevation taken along the line 4—4 of Fig. 2, and

Figure 3:
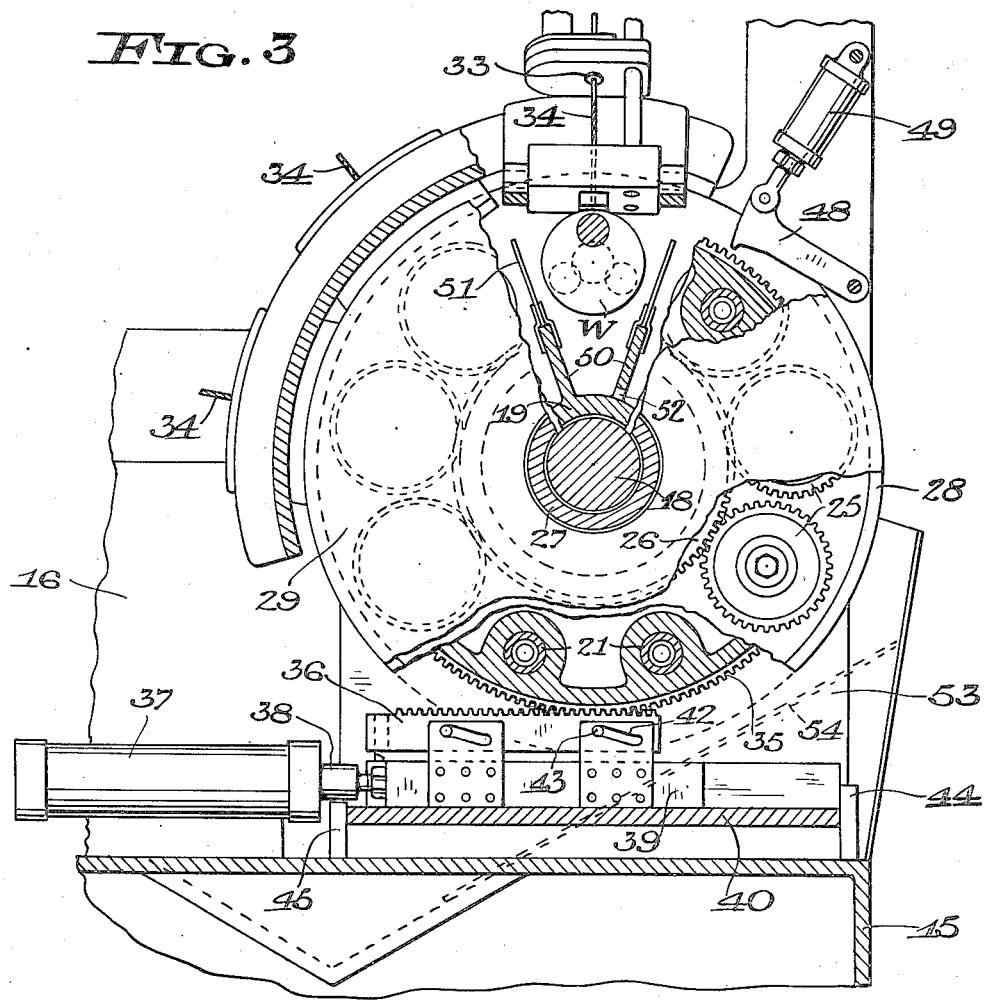
Fig. 3 is a sectional elevation taken along the line 3—3 of Fig. 1.
Figure 5:
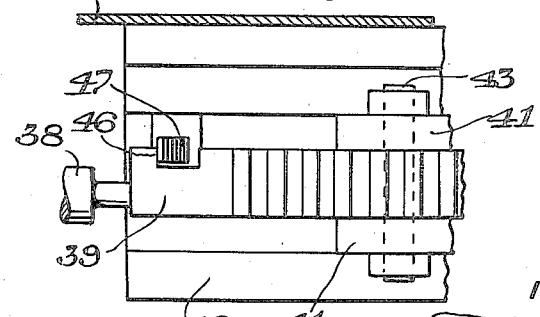
Fig. 5 is a detail view of a rack mechanism.

In these drawings, 15 designates a base frame carrying an upright 16 to which are secured tool-supporting members 17. A horizontal shaft 18 is mounted on the upright 16 and supports thereon a rotary work carrier 19, the shaft being rotatable on the upright, or the work carrier being rotatable on the shaft. In some instances, the shaft may be mounted on a second upright 16' spaced from the upright 16. The uprights form spaced supports for the shaft, and the tool-supporting members 17 form beams or frame members rigidly connecting the spaced uprights.

On the work carrier are journalled a number of work holders 20. In the present instance, the work carrier is in the form of a spool, and the work holders are mounted on one head of the spool with their axes arranged in parallel relation to and equidistant from the axis of the carrier. The work holders 20 are here indicated to be in the nature of lathe stocks for holding work pieces W, such as crank-shafts, which are to be provided with drilled oil holes. With work pieces of this character, it will be understood that they are supported at both ends. Each work holder 20 is provided with a spindle 21 carrying a center 22 adapted to enter a recess in the end of the crank-shaft. A driving dowel 23 is secured to the work holder to fit in a recessed part of the crank-shaft, and a saddle 24 on the work holder facilitates the loading and unloading of the crank-shaft. The companion work holder 20' may be of similar construction and is mounted in the other head of the spool-shaped carrier.

The spindle of each work holder 20 carries a gear 25 which meshes with the peripheral teeth of a stationary gear 26 concentric with the work carrier and secured to the frame upright 16 by an annular spacer or hub 27 surrounding the shaft 18. The work carrier is given a step-by-step rotation, as hereinafter described, causing the gears 25 to roll on the stationary gear 26 and thus turning the work pieces to different tooling positions. To house the gears 25 and 26, the work carrier is provided with a peripheral flange 28 surrounding the series of gears 25 and having secured to it a disk-like cover plate 29. The housing thus formed protects the gears and provides a lubricant chamber for the gears and spindles.

For drilling the oil passages in the crank-shafts a plurality of sets of drilling heads 30 are mounted on the supporting members 17. In the present instance, three angularly spaced sets of drilling heads are provided for operation on each crank-shaft in three successive tooling positions, but this relation may be changed to suit conditions. Each drilling head comprises an adjustably mounted frame 31 carrying an electric motor 32 having a driving connection with a slidably supported drill chuck 33 for a drill 34. The drilling heads in each set extend at various angles for drilling inclined holes in the crank-shaft. The drills may be fed to the work in any suitable manner.

In order to place the crank-shafts in their various drilling positions, means are provided for moving and holding the work holders. A gear 35 is mounted on the work carrier 19 and meshes with a subjacent horizontal rack 36. A horizontal double-acting hydraulic cylinder 37 is mounted on the base 15, and its piston rod 38 is secured to an actuator bar 39 slidably fitting in a channeled guide member 40. Spaced pairs of parallel cheek plates 41 are secured to the opposite sides of the actuator bar and flank the rack 36 at each side. Each pair of cheek plates is provided with aligned inclined cam slots 42 through which passes a pin 43 secured to the rack 36, the rack being thus shiftably supported from the actuator bar. The rack is meshed during its advancing stroke with the gear 35, and is depressed out of engagement with the gear during its retracting stroke. The stroke of the rack is limited at each end by stops 44 and 45 carried on the guide member 40 and struck by the actuator bar. A latch abutment 46 is formed at one end portion of the rack 36 for engagement with a spring-pressed latch 47 to releasably retain the rack against advancing movement until it is raised into mesh with the gear 35. The rotary work carrier 19 is locked in each of its several drilling positions by a swingably mounted locking dog 48 engageable with the gear 35 and movable into and out of locking position by a pivotally mounted double-acting hydraulic cylinder 49. The locking dog has a wedging engagement with adjacent teeth of the gear 35 to move the work carrier a slight distance, if necessary, and to accurately locate the work carrier in each of the several drilling positions. Preferably, both heads of the spool-shaped carrier are provided with driving gears 35, so as to insure smooth operation and to minimize torsion in the carrier.

The spool-shaped work carrier is preferably provided with radial ribs 50 carrying radial guard plates 51 extending between adjacent work pieces. Drain openings 52 are formed in the ribs 50 for the cutting lubricant. A vertical guard plate 53 is carried by the guide member 40 and fits about the end portion of the work carrier to prevent the entrance of chips into the rack and gear connection. An inclined chip chute 54 is carried on the base 15.

In operation, an attendant loads successive crank-shafts W onto the rising side of the intermittently stationary work carrier 19, each crank-shaft being rested, if necessary, on the work holder saddle 24 while it is mounted in place on the work holder. After each drilling operation, oil is admitted under pressure to one end of the hydraulic cylinder 37, causing the actuator bar 39 to move on an advancing stroke. During the first part of such stroke the depressed indexing rack 36 is held against longitudinal movement by the latch 47, but is raised into mesh with the carrier gear 35 by the cam action of the pins 43 in the slots 42, which releases the indexing rack from the latch, the rack moving upwardly out of engagement with the latch bolt, which remains stationary. In the interval between the end of the drilling operation and the raising of the rack 36, the locking dog 48 is released from the gear 35 by the hydraulic cylinder 49, so that when the pins 43 engage the rear ends of the slots 42, as seen in Fig. 3, the indexing rack 36 will be advanced by the actuator bar and rotate the work carrier through a predetermined angle to the succeeding drilling position, the advancing movement of the actuator bar being limited by the stop 44. The locking dog 48 is then moved to locking position by the hydraulic cylinder 49 to accurately locate the work carrier in drilling position. After the work carrier is thus locked in drilling position, the actuator bar 39 and rack 36 are retracted by the hydraulic cylinder 37. In the first part of the retracting movement of the actuator bar, the rack 36 is held against longitudinal movement by the gear 35, and the cam action between the pins 43 and slots 42 depresses the rack out of engagement with the gear, whereupon the rack follows the actuator 39. The retracting movement of the actuator is limited by the stop 45, and the rack is locked in retracted position by the latch 47, ready for the next advance. During the rotation of the work carrier the gears 25 on the work holder spindles roll along the stationary gear 26 so as to present different parts of the crank-shafts to the successive drilling means. After the work carrier is locked in position by the dog 48, the drills 34 are advanced into the crank-shafts by any suitable feeding means, not shown. At the end of the drilling operation, the drills are retracted from the work, and the cycle of operation is repeated. The drilled crank-shafts are removed by the attendant at the loading station. The rotatable work holder gears 25 remain in constant mesh with the non-rotatable gear 26 during the rotation of the work holders and also while the work holders are stationary, thus distributing and minimizing wear, avoiding lost motion, reducing inertia and impact effects and insuring smooth travel and acceleration, the work holders rotating during the entire interval between tooling positions.

What I claim as new and desire to secure by Letters Patent is:

1. In a machine tool, the combination of an intermittently rotatable work carrier having a head, a spindle rotatably mounted in said head eccentrically of the carrier axis and extending through said head, work holding means secured to an end portion of said spindle at one side of said head, a gear secured to the other end portion of said spindle at the other side of said head, tool means for operating on the work, a non-rotatable gear concentric with said carrier and meshing with said spindle gear for turning the work to different tooling positions upon the rotation of said carrier, and a housing member secured to the peripheral portion of said carrier head to rotate with the carrier, said housing member extending inwardly toward the carrier axis, and said gears being enclosed between said housing member and the adjacent side of said carrier head.

2. In a drilling machine for crank-shafts and the like, the combination of a rotatable carrier having axially spaced heads, means for intermittently rotating said carrier, aligned work holders mounted on said heads eccentrically of the carrier axis for supporting the opposite end portions of a crank-shaft to be drilled, at least one of said holders being rotatable and having driving means for the crank-shaft, drilling means for operating on the crankshaft while said crank-shaft is stationary, a non-rotatable gear concentric with said carrier, and a gear on said rotatable work holder in constant mesh with said non-rotatable gear for turning the crank-shaft to different drilling positions.

FRANK M. DAVIS.